United States Patent
Sekiguchi

Patent Number: 5,237,465
Date of Patent: Aug. 17, 1993

[54] TIMING SIGNAL CONVERTER IN RECORDING/REPRODUCING APPARATUS WITH ROTARY HEAD DRUM

[75] Inventor: Fukunori Sekiguchi, Tokyo, Japan
[73] Assignee: Sony Corporation, Tokyo, Japan
[21] Appl. No.: 733,887
[22] Filed: Jul. 22, 1991

[30] Foreign Application Priority Data
Jul. 24, 1990 [JP] Japan .................. 2-193997

[51] Int. Cl.⁵ .............................................. G11B 5/09
[52] U.S. Cl. ............................ 360/51; 360/32; 360/48; 360/36.2
[58] Field of Search ............. 360/51, 64, 48, 36.2, 360/32, 19.1, 77.14, 77.15, 77.08, 73.05, 70, 14.3, 52, 18; 358/310

[56] References Cited

U.S. PATENT DOCUMENTS
| | | | |
|---|---|---|---|
| 4,788,602 | 11/1988 | Sekiguchi et al. | 360/14.3 X |
| 5,097,364 | 3/1992 | Goto et al. | 360/32 |
| 5,168,396 | 12/1992 | Sudoh | 360/51 |

FOREIGN PATENT DOCUMENTS
| | | |
|---|---|---|
| 0254279 | 1/1988 | European Pat. Off. |
| 0352338 | 1/1990 | European Pat. Off. |
| 0373895 | 6/1990 | European Pat. Off. |
| 1-091389 | 4/1989 | Japan |
| 2-132677 | 5/1990 | Japan |

OTHER PUBLICATIONS
Patent Abstracts of Japan vol. 13, No. 324 (P-903) Jul. 21, 1989 & JP-A-1 091 389 (Fuosutekusu K.K.) Apr. 11, 1989.
JP-A-2 132677 (Matsushita Electric Ind. Co., Ltd. May 22, 1990 & Patent Abstracts of Japan, vol. 14, No. 360 (P-1088) Aug. 3, 1990.

*Primary Examiner*—Robert J. Pascal
*Assistant Examiner*—Ali Neyzari
*Attorney, Agent, or Firm*—William S. Frommer; Alvin Sinderbrand

[57] ABSTRACT

A recording and reproducing apparatus having a rotary head drum includes a timing signal converter for converting one of a first timing signal and a second timing signal to the other. The converter comprises a generator for generating first and second select signals, a memory for storing the first timing signal in response to the first select signal and for reading out the stored signal in response to the second select signal, a processor for processing the output signal of the memory to generate the second timing signal synchronously with the rotation of the rotary head drum, and a recording/reproducing head for recording the second timing signal onto a slant track formed on a recording medium, and for reproducing the second timing signal. The reproduced second timing signal is processed and supplied to the memory for storage therein in response to a signal synchronous with the rotation of the rotary head drum and for subsequent read out therefrom in response to a signal unsynchronized with the rotation of the drum so as to generate a timing signal indicating the position of the recording medium.

5 Claims, 5 Drawing Sheets

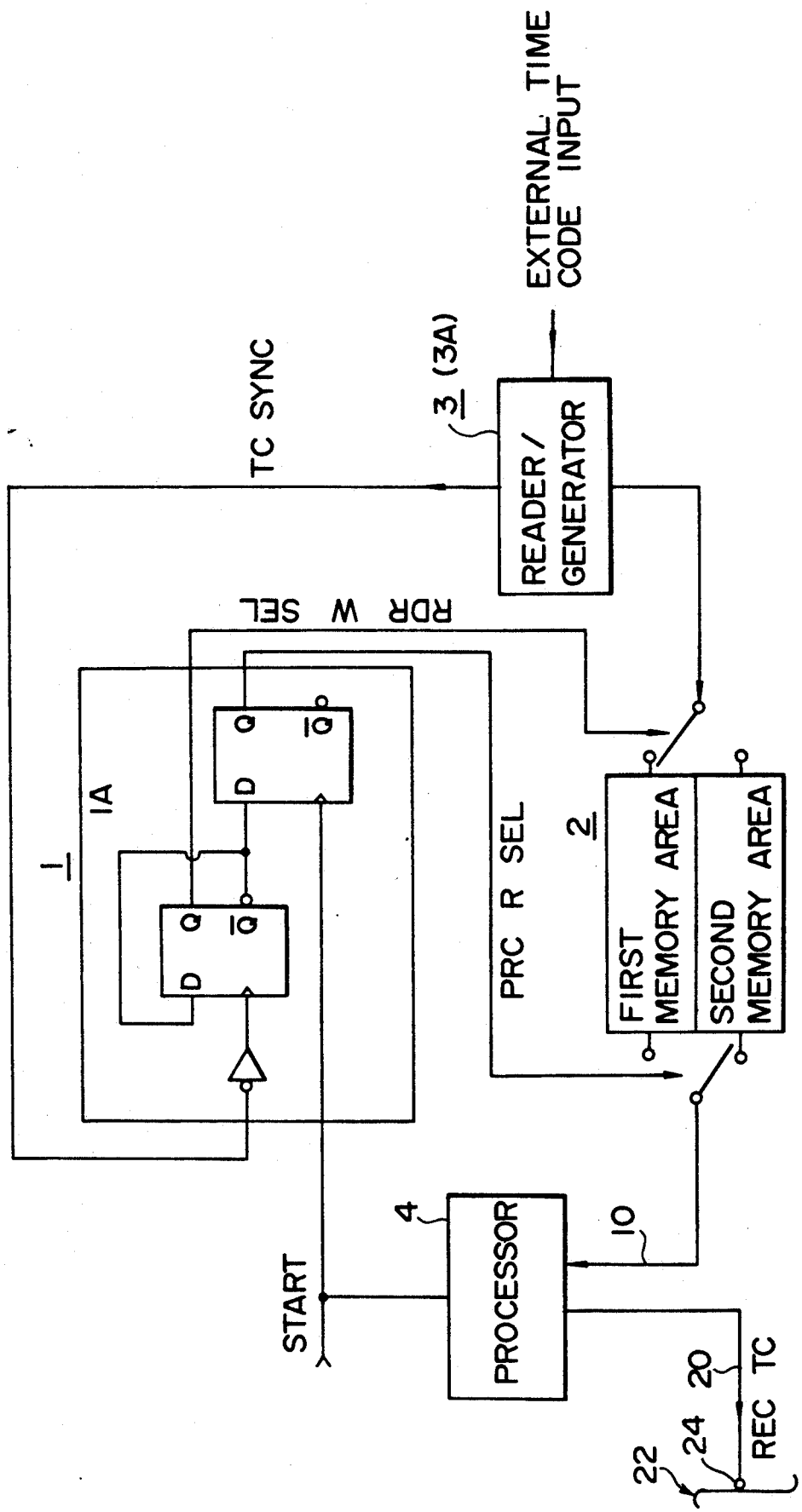

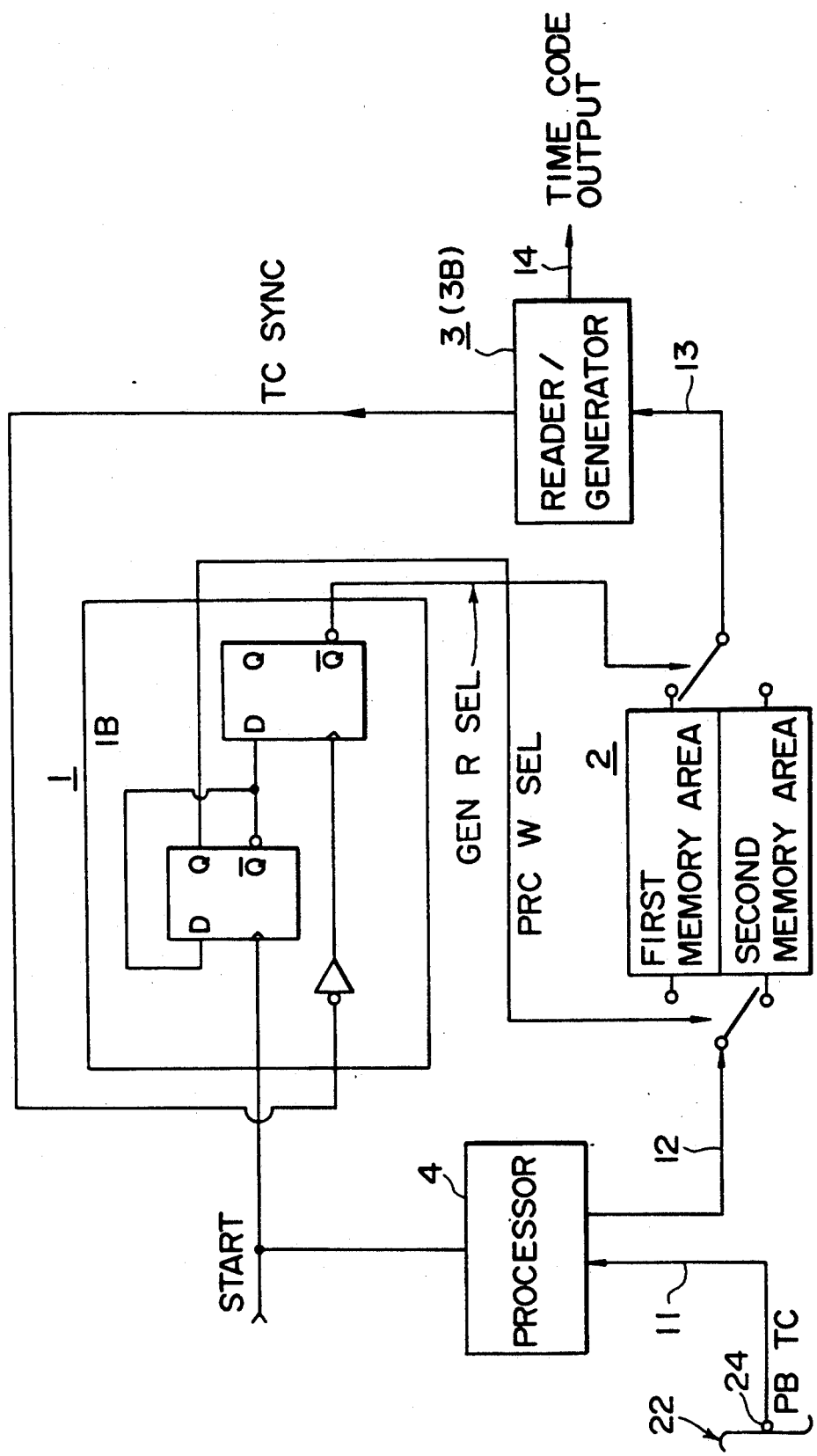

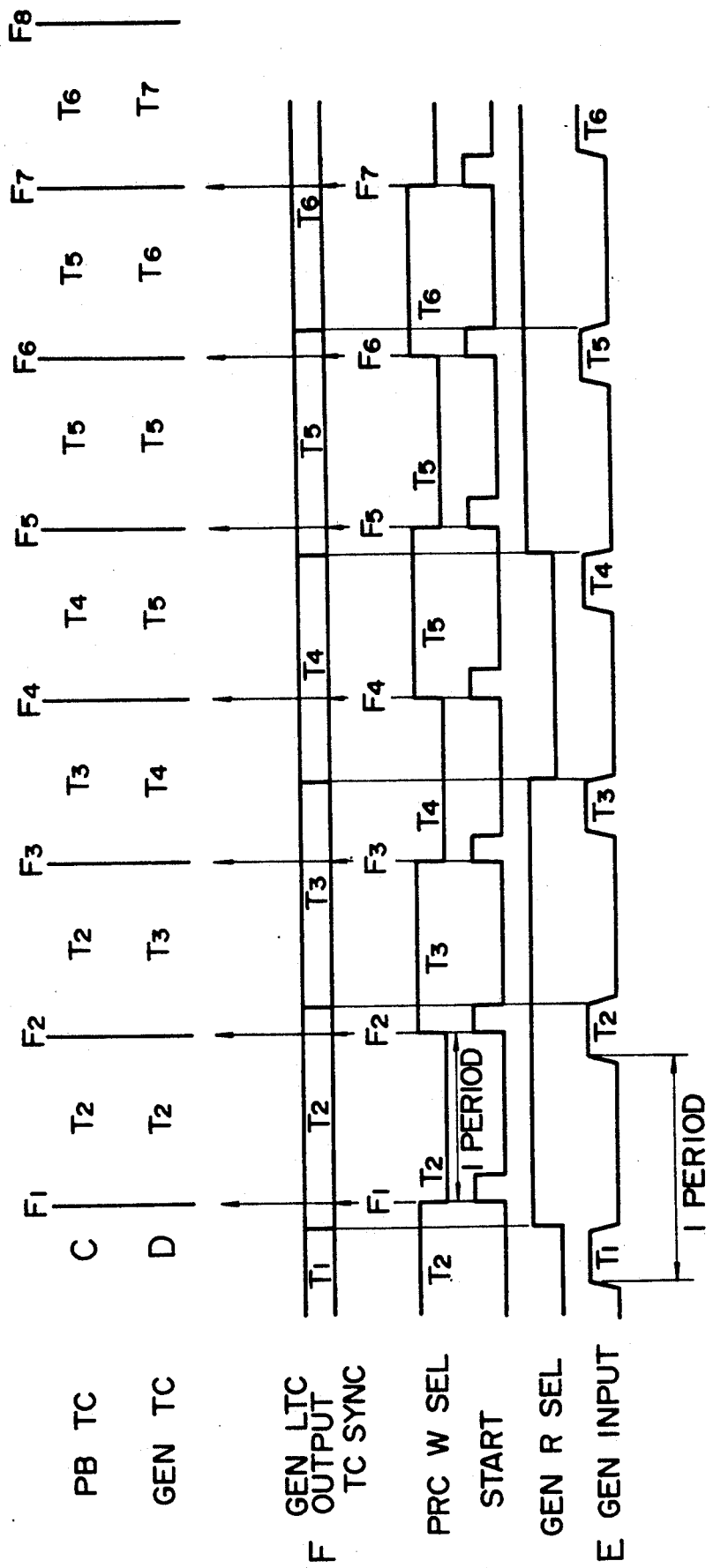

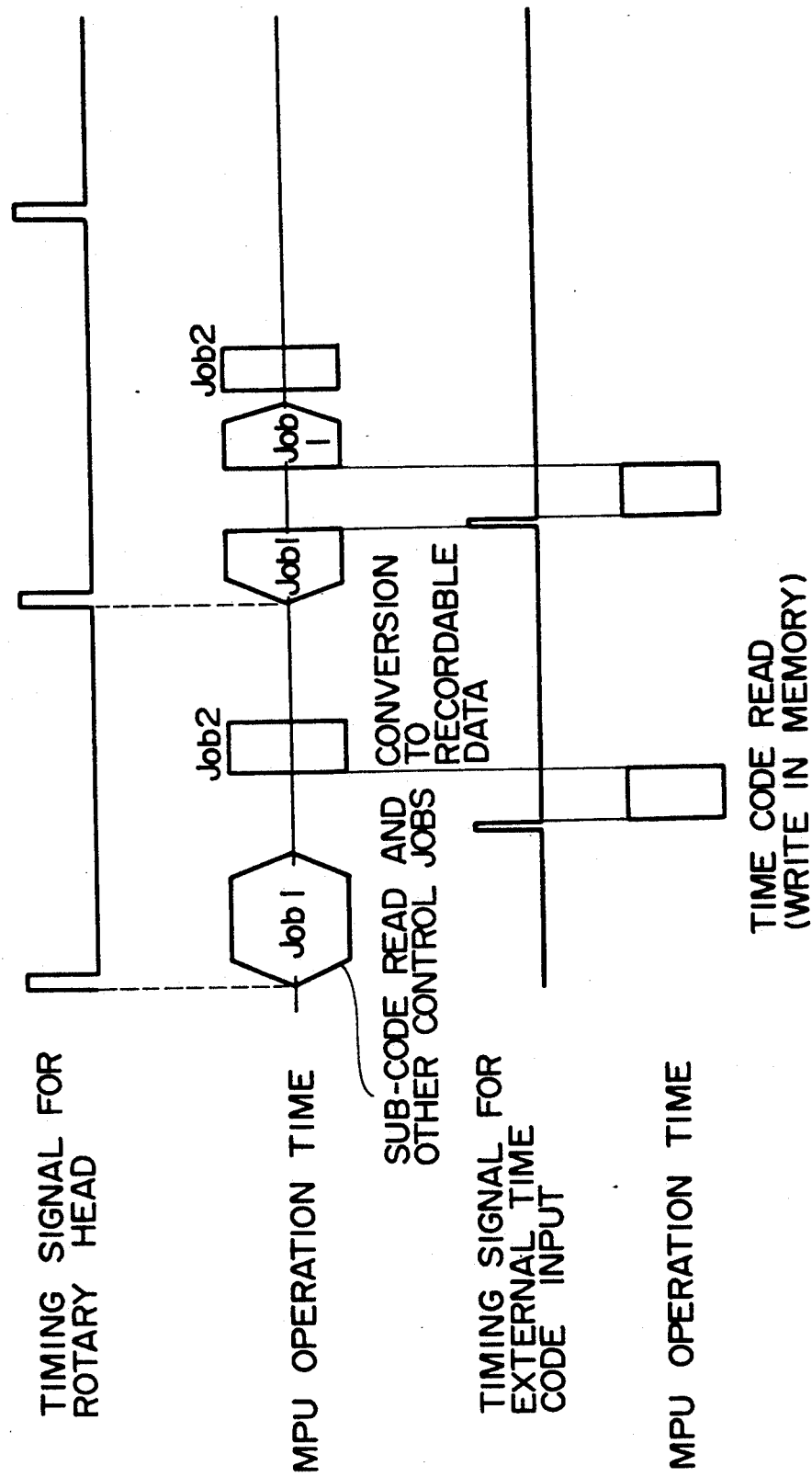

TIMING SIGNAL CONVERTER IN RECORDING/REPRODUCING APPARATUS WITH ROTARY HEAD DRUM

BACKGROUND OF THE INVENTION

1. Field of the Invention

The present invention relates to a timing signal converter for use in a recording/playback apparatus having a rotary head drum to record or reproduce a time code unsynchronized with the rotation of a rotary head thereof (e.g., a time code in the longitudinal direction of a recording tape) without the necessity of employing a fixed time code recording/playback head.

2. Description of the Prior Art

In a rotary head type recording/playback apparatus, it is necessary to record or reproduce a time code unsynchronized with the rotation of the rotary head.

For example, in a rotary head type digital audio tape recorder (R-DAT), it may be necessary to record a longitudinal time code (LTC) on a tape for use by a video tape recorder (VTR) to facilitate for editing and so forth. In such case, it becomes necessary for a recording/playback section to operate in compliance with a timing signal synchronized with the rotary head, and also for an input/output signal section to operate in compliance with another timing signal such as a longitudinal time code unsynchronized with the rotary head.

For meeting such requirement, a control signal is recorded for controlling the longitudinal time code (LTC) or the motion of a tape, on a track separately from a slant recording track formed by the rotary head. According to the above method, however, it is necessary to provide a fixed head, in addition to the ordinary rotary head, for recording a time code in the longitudinal direction of the tape.

The present applicant proposed an improvement previously as disclosed in Japanese published patent application Ser. No. Sho 63 (1988)29391, wherein the necessity of forming a longitudinal recording track by a fixed head is eliminated by recording a converted time code in a sub-code area of a slant recording format in an R-DAT recording medium.

According to the technique disclosed in Japanese published patent application Ser. No. Sho 63 (1988)-29391, in an exemplary case wherein a 30-Hz time code corresponding to a head rotation rate of 30 r.p.m. in a rotary head type VTR is recorded, it becomes possible to record and reproduce a 30-Hz time code in an R-DAT recording medium where a head is driven at a rate of 100/3 r.p.m. In order to do so the apparatus includes a time code reader, a time code generator, a counter for counting the number of bits, and a latch circuit for latching the counted value, wherein a carry pulse for the counter is generated at a predetermined value and is supplied as a reference synchronizing signal.

However, where the above-described technique is embodied in a practical hardware structure, it is considered desirable, due to the need to combine other related operations, to provide a microprocessor (MPU) for synchronously controlling the time code reader and the time code generator, or to enable the microprocessor to perform both generation and reading of the time code.

In this case, as shown in FIG. 4 representing an exemplary operation time allocation, a microprocessor operation based on a timing signal synchronized with a rotary head can interfere with an operation based on another timing signal unsynchronized with the rotary head. Consequently, it is necessary to interrupt one operation while performing the other operation or to provide a period free from any interruption so as to execute a batch of jobs. As a result of such process, a temporal noncoincidence is induced which eventually results in a timing discrepancy, a partial imcompletion of the job, and partial carry-over thereof to the next cycle. Moreover, it is not easy to prepare a microprocessor program with an interrupt process which includes solutions for the above problems.

OBJECT AND SUMMARY OF THE INVENTION

It is an object of the present invention to provide an improved timing signal converter for use in a rotary head type recording/reproducing apparatus wherein it is unnecessary to provide an interrupt process for a microcomputer for converting a timing signal synchronized with a rotary head to control a recording/playback section and another timing signal unsynchronized with the rotary head and used in an input/output data section.

According to one aspect of the present invention, there is provided a timing signal converter for converting a first timing signal to a second timing signal or vice versa in a recording/reproducing apparatus with a rotary head drum. The converter comprises means for generating first and second select signals in response to the first and second timing signals respectively, memory means for storing the first timing signal in response to the first select signal and for reading out the stored timing signal in response to the second select signal, means for processing the output signal of the memory means to generate the second timing signal synchronously with the rotation of the rotary head drum, means for recording the second timing signal on a slant track formed on a recording medium, and means for reproducing the second timing signal, wherein the reproduced second timing signal is processed by the processing means and then is supplied to the memory means in a manner to be stored therein in response to a signal synchronous with the rotation of the rotary head drum and to be read out therefrom in response to a signal unsynchronized with the rotation of the drum so as to generate a timing signal indicating the position of the recording medium.

In the present invention equipped with a semiconductor memory having first and second memory areas, data is written in the first memory area and then is read out therefrom while data is written in the second memory area, and such operations are repeated alternately.

By reading the written data in the next cycle (i.e., with a delay of substantially one cycle), it is possible to read the data properly even if the memory read timing is not in synchronism with the memory write timing.

When the data written in the memory synchronously with the rotation of the rotary head drum is read out unsynchronized with the rotary head drum, the signal recorded by the rotary head on the slant track can be reproduced therefrom and output as a time code or the like unsynchronized with the rotary head drum. However, since reading is executed with a delay of substantially one cycle as compared with writing in the semiconductor memory, the time code data thus read out is replaced by calculation with the proper time code data preceding it by substantially one cycle.

There is further provided a timing circuit which generates a signal for selecting the write area and the read area of the semiconductor memory in accordance with a timing signal synchronized with the rotary head drum and another timing signal used in an input/output section and unsynchronized with the rotary head drum, so that it becomes possible to eliminate the need for an interrupt process executed by the microprocessor.

The above-mentioned apparatus solves the known difficulties encountered in preparing an interrupt program to avert an inconvenience that may otherwise be caused during the operation of the microprocessor due to interference of the two timing signals. Furthermore, the present invention facilitates manufacture of a recording/playback apparatus which is capable of recording a timing code unsynchronized with the rotary head without the necessity of forming a recording track for a fixed head.

The above and other features and advantages of the present invention will become apparent from the following description which will be given with reference to the illustrative accompanying drawings.

BRIEF DESCRIPTION OF THE DRAWINGS

FIGS. 1(a) and 1(b) are block diagrams of an exemplary embodiment of the present invention, representing elements thereof involved in carrying out a recording mode and a playback mode respectively;

FIG. 3 is a timing chart showing the operation of the exemplary embodiment in the playback mode; and FIG. 4 shows an exemplary allocation of operation time in a microprocessor in a previously proposed arrangement.

DESCRIPTION OF THE PREFERRED EMBODIMENT

Figure 2:
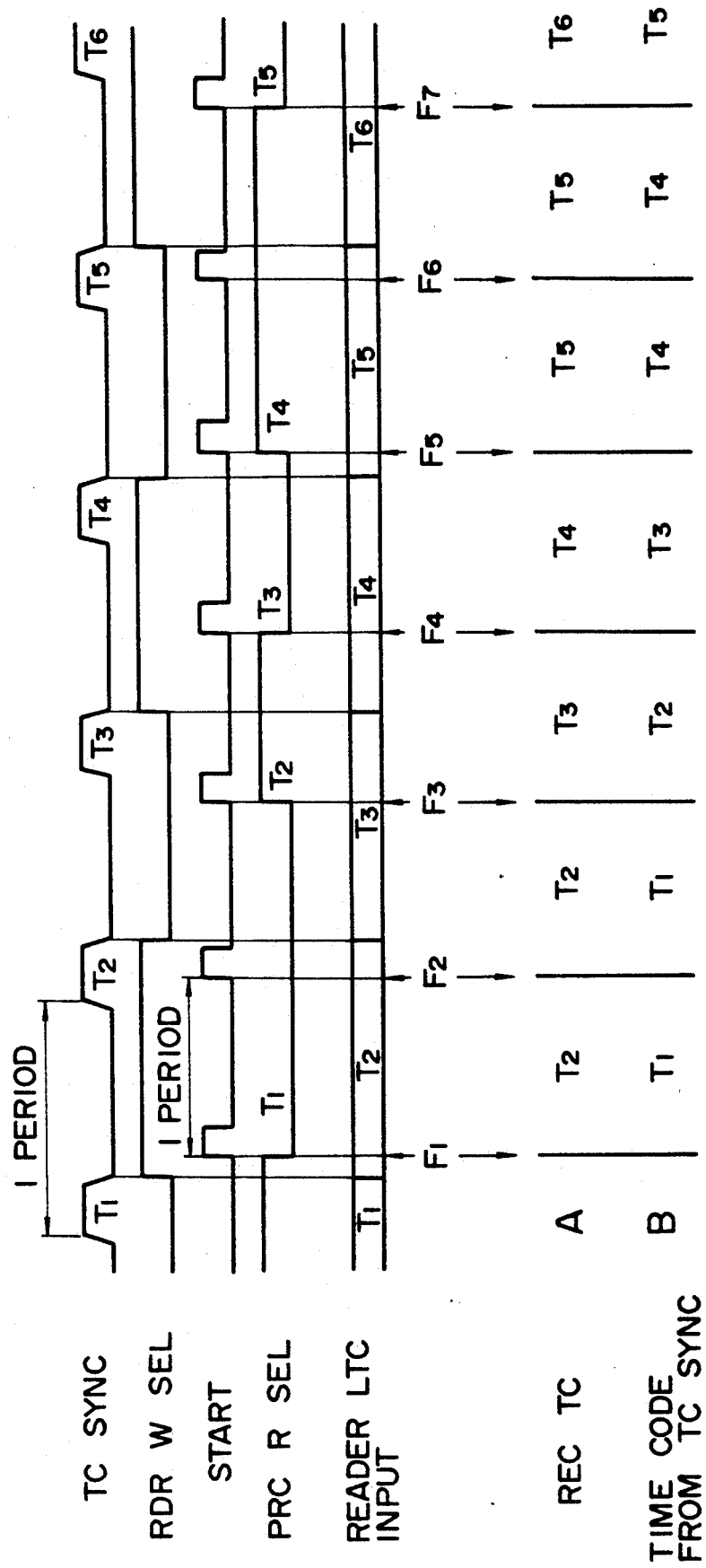
FIG. 2 is a timing chart showing the operation of the exemplary embodiment in the recording mode.

Hereinafter a preferred embodiment of the present invention will be described in detail with reference to block diagrams of FIGS. 1(a) and 1(b).

Although the structure of the disclosed embodiment is shown with regard to a recording mode (a) and a playback mode (b) separately to facilitate understanding thereof, its actual hardware comprising a timing circuit 1, a semiconductor memory 2, a reader/generator 3 and a processor 4 is so constituted as to be operable in both recording and playback modes selectively.

For example, the reader/generator 3 is capable of functioning as a reader and a generator in accordance with a program prepared in the microprocessor. It is a matter of course that each of the reader and the generator is an individual logic circuit usable selectively through switching.

A description of the structure involved in the recording operation is now provided with reference to FIG. 1(a). There are included a semiconductor memory 2 having a first memory area and a second memory area, and a timing circuit 1 for generating a memory-area select signal to controllably alternate reading and writing in the first and second memory areas.

Initially an external time code input (unsynchronized with the rotary head drum) is supplied to the reader/generator 3. In a recording mode, the reader/generator 3 serves as a reader 3A for feeding a timing signal TC SYNC obtained from the external time code input to the timing circuit 1 while writing the time code data, which has been read by the reader 3A, in the semiconductor memory 2 in synchronism with the timing signal TC SYNC.

In this stage of the operation, a select signal generated from the timing circuit 1 selectively determines which of the two memory areas of the semiconductor memory 2 is to be used for writing or reading the data, and also determines the read timing.

The timing circuit 1 generates a memory area select signal from both a timing signal START synchronized with the rotary head drum (including a magnetic head 24 as illustrated in FIG. 1(a) and the timing signal TC SYNC unsynchronized therewith. Meanwhile in a recording mode, the timing circuit 1 is represented by the configuration denoted by reference numeral 1A in FIG. 1(a).

The timing circuit 1 also generates a memory write area select signal RDR W SEL for writing, at the timing of the external input data, the external input time code data read out by the reader 3A and unsynchronized with the rotary head drum, and further generates a memory area selecting/read timing designating signal PRC R SEL for enabling the processor 4 to read the external input time code data from the semiconductor memory 2 in the next cycle (with a delay of substantially one cycle) in synchronism with the rotary head drum. The time code data thus read is converted by the processor 4 into a predetermined data format suitable for recording on a tape 22 (e.g., from parallel data into serial data), thereby producing a tape-recordable time code (synchronized with the rotary head). This time code is then recorded on a slant recording track by a magnetic head 24 the rotary head. In the case of an R-DAT recording medium, such time code is recorded in a sub-code area. The processor 4 is generally composed of a microprocessor (MPU) and is synchronized with the control action for the rotary head and the tape motion. The absolute-value of the time code delay caused by reading with a delay of substantially one cycle follows a rule described later, so that such delay can be calculated and corrected.

The structure involved in the playback mode will be described below with reference to FIG. 1(b).

There are included a semiconductor memory 2 having a first memory area and a second memory area, and a timing circuit 1 for generating a select signal to controllably alternate reading and writing in the first and second memory areas. In the playback mode, the playback time code data (synchronized with the rotary head drum) read from the slant recording track as the tape 22 by the rotary head 24 is converted into a predetermined data format suitable for writing in the memory (e.g., converted from serial data into parallel data), and then is written in the semiconductor memory 2 by the processor 4 in synchronism with the rotary head drum.

In this stage of the operation, a select signal generated from the timing circuit 1 selectively determines which of the two memory areas of the semiconductor memory 2 is to be used for writing the data and also determines the read timing, as in the recording mode.

The timing circuit 1 generates a memory area select signal from the timing signal START synchronized with the rotary head drum and also from the timing signal TC SYNC unsynchronized therewith in the same manner as in the recording mode. In the playback mode, the timing circuit is represented by the configuration denoted by reference numeral 1B in FIG. 1(b).

The timing circuit 1 supplies a memory write area select signal PRC W SEL for writing, in synchronism with the rotary head, the time code data which is synchronized with the rotary head drum and is to be written in the memory by the processor 4, and also supplies a memory read area selecting/read timing designating signal GEN R SEL for enabling the time code generator 3B of the reader/generator 3 to read, in the next cycle (with a delay of substantially one cycle), the written data in synchronism with the external time code which is unsynchronized with the rotary head drum.

The time code data thus read out by the time code generator 3B is output in synchronism with the external time code but unsynchronized with the rotary head drum. It is to be noted here that, since the time code data is read out from the semiconductor memory 2 with a delay of substantially one cycle, a delay of substantially one cycle in the tape position data occurs as well. For this reason, at the time of writing in the memory by the processor 4, a calculation is executed on the basis of the reproduced time code to obtain a proper time code value substantially one cycle prior thereto, and the proper data is written in the semiconductor memory 2. This process will be explained later in detail.

Hereinafter an exemplary operation of this embodiment will be described with reference to the timing charts of FIGS. 2 and 3.

FIG. 2 shows a timing chart for the recording mode where the time code data at the rise of the signal START synchronized with the rotary head is to be determined with regard to an external time code (e.g., LTC) input to the reader 3A.

In the example of FIG. 2, a synchronizing signal TC SYNC of the external time code input LTC and values T1, T2, T3 ... Ti ... (where i is a positive integer) of the time code are output from the reader 3A in conformity with the synchronizing signal portion at the end of the LTC input to the reader 3A. A memory write area select signal RDR W SEL is generated in response to such synchronizing signal TC SYNC, thereby executing a prompt operation for writing the time code values T1, T2, T3 ... Ti ... in the semiconductor memory 2. When a timing signal synchronized with the rotary head drum, such as a signal START having a frequency of 100/3 Hz, is inputted to the timing circuit 1, then the inverse of the memory write area select signal RDR W SEL is latched at the rise of the signal START to thereby generate a memory read area select signal PRC R SEL. More specifically, in synchronism with the START signal, the processor 4 reads the data from that one of the first and second memory areas in the semiconductor memory 2 which is not then writing the time code. When the contents T1, T2, T3 ... Ti .... (the tape-recordable time code REC TC) of the time code data read out between observation points F1, F2, F3 ... Fi ... corresponding to the rise of the signal START are compared with the initial output of the reader 3A, it is found that the number represented by each time code Ti is increased by 1. Although such a numerical shift is unavoidable, the time code value can be corrected easily by a simple calculation since the pattern of the time code data is generally known. The calculation for carrying out such correction may be executed by the processor 4 before the tape recording operation or may be performed with regard to the playback output data in case there exists no restriction relative to the tape recording format.

For example, in FIG. 1(a), a time code shown in line B of FIG. 2 is delivered to the input line 10 of the processor 4 by the operation described above, and a next time code shown in line A of FIG. 2 is obtained from the output line 20 of the processor 4.

An exemplary timing chart in the playback mode is shown in FIG. 3. The time code data T1, T2, T3 ... read out by the rotary head are supplied in the sequence shown in line C of FIG. 3 to the processor 4 via the input line 11 thereof shown in FIG. 1(b), then converted into a predetermined data format and written in the semiconductor memory 2 via the output line 12 of the processor 4 in synchronism with the memory write area select signal PRC W SEL generated at the rise of the signal START synchronized with the rotation of the rotary head drum. The time code obtained from the output line 12 is shown in line D of FIG. 3 next to the reproduced time code of line C and calculated in the processor 4. The time code shown in line D is supplied to the memory area 2. In this stage, the time code data is read out from the memory area designated by the memory read area select signal GEN R SEL obtained by latching the inverse of the memory write area select signal PRC W SEL at the rise of the synchronizing signal TC SYNC of the external time code LTC. When the contents T1, T2, T3 ... Ti ... of the time code data thus read out are compared with the contents of the playback time code PB TC at observation points F1, F2, F3 ... Fi ... each coincident with a corresponding rise of the signal START, it is found that a proper result is attained by writing the value of the preceding data Ti in the memory at the point Fi. Since the prescribed rule for the data Ti is usually known in advance, the above calculation can be easily executed, as mentioned above, by the processor 4 on the basis of the time code value in the playback mode when the playback serial data is converted into parallel data.

The time code shown in line D of FIG. 3 is written in the memory areas 1 and 2 of the semiconductor memory alternately in accordance with the data write select signal PRC W SEL synchronized with the rotary head drum. The time code thus written is read out from the memory areas 1 and 2 of the semiconductor memory 2 alternately in accordance with the unsynchronized data read select signal GEN R SEL at the timing shown in FIG. 3, whereby a time code as shown in line E of FIG. 3 is input to the time code generator 3 via the input line 13. Thereafter the time code thus read is processed by the time code generator 3 so that a time code TC SYNC shown in line F of FIG. 3 is supplied via the output line 14 of the time code generator 3 shown in FIG. 1(b).

In the above embodiment including the timing circuit 1 additionally provided and the semiconductor memory 2 with first and second memory areas, the processor 4 must carry out a calculation for replacing the time code data. However, there exists no necessity of an interrupt function with respect to the signals having, e.g., a frequency of 100/3 Hz synchronized with the rotary head and a frequency of 30 Hz unsynchronized with the rotary head, hence ensuring a remarkably advantageous effect.

According to the above-described embodiment of the present invention, there is realized an improved timing signal converter for use in a rotary head type recording/playback apparatus, wherein a semiconductor memory having first and second memory areas is included, and a timing circuit is provided for alternately selecting a data writing operation and a data reading operation with respect to the memory. Accordingly it becomes possible to eliminate the necessity of executing an interrupt process by a microprocessor for converting a timing signal synchronized with a rotary head to control a recording/playback section and another timing signal unsynchronized with the rotary head and used in an input/output data section.

Consequently, it is possible by means of the present invention to avoid the known difficulties encountered in the preparation of an interrupt program to avert an inconvenience that may otherwise be caused during the operation of the microprocessor due to interference of the two timing signals synchronized and unsynchronized respectively with the rotary head drum. Furthermore, the present invention facilitates manufacture of a recording/playback apparatus which is capable of recording a timing code unsynchronized with the rotary head drum without the necessity to provide a fixed head.

What is claimed is:

1. A recording and reproducing apparatus having a rotary head drum for recording a first timing signal in a slant track on a record medium, the first timing signal being produced by converting a second timing signal unsynchronized with the rotation of the rotary head drum, comprising:

select signal producing means for producing a first select signal synchronized with the rotation of said rotary head drum and a second select signal synchronized with said second timing signal;

memory means for storing said second timing signal in response to said second select signal and for reading out the stored timing signal in response to said first select signal;

processing means for producing said first timing signal based on the stored timing signal read from the memory means such that the first timing signal is synchronized with the rotation of said rotary head drum;

recording means for recording said first timing signal on a slant recording track formed on a recording medium with the use of the rotary head drum;

means for reproducing said first timing signal from the recording medium;

means for storing the reproduced first timing signal in said memory means synchronously with the rotation of said rotary head drum; and means for reading the reproduced first timing signal from said memory means in response to a signal unsynchronized with the rotation of said rotary head drum to provide an output timing signal indicating a position of said recording medium.

2. The apparatus according to claim 1, wherein said processing means is operative to produce said first timing signal having a value compensated for a delay of said second timing signal while stored by said memory means.

3. The apparatus according to claim 1, in which said recording means is operative to record said first timing signal in a slant recording track formed on a magnetic tape.

4. The apparatus according to claim 1, in which said select signal producing means is operative to produce the first and second select signals having frequencies of 100/3 Hz and 30 Hz representively.

5. A method of recording and reproducing a first timing signal in a slant track on a record medium with the use of a rotary head drum, the first timing signal being produced by converting a second timing signal unsynchronized with the rotation with the rotary head drum, comprising the steps of:

producing a first select signal synchronized with the rotation of said rotary head drum and a second select signal synchronized with said second timing signal;

storing said second timing signal in a memory means in response to said second select signal;

reading the stored timing signal from the memory means in response to said first select signal;

producing said first timing signal based on the stored timing signal read from the memory means such that the first timing signal is synchronized with the rotation of the rotary head drum;

recording said first timing signal on a slant recording track formed on a recording medium with the use of the rotary head drum;

reproducing the first timing signal from the recording medium;

storing the reproduced first timing signal in said memory means synchronously with the rotation of said rotary head drum; and reading the reproduced first timing signal from said memory means in response to a signal unsynchronized with the rotation of said rotary head drum to provide an output timing signal indicating a position of said recording medium.

* * * * *